INVENTORS
RICHARD KOBLER
WILLIAM F. FAGAN
EDWARD FELDMAN

BY George H. Fritzinger
AGENT

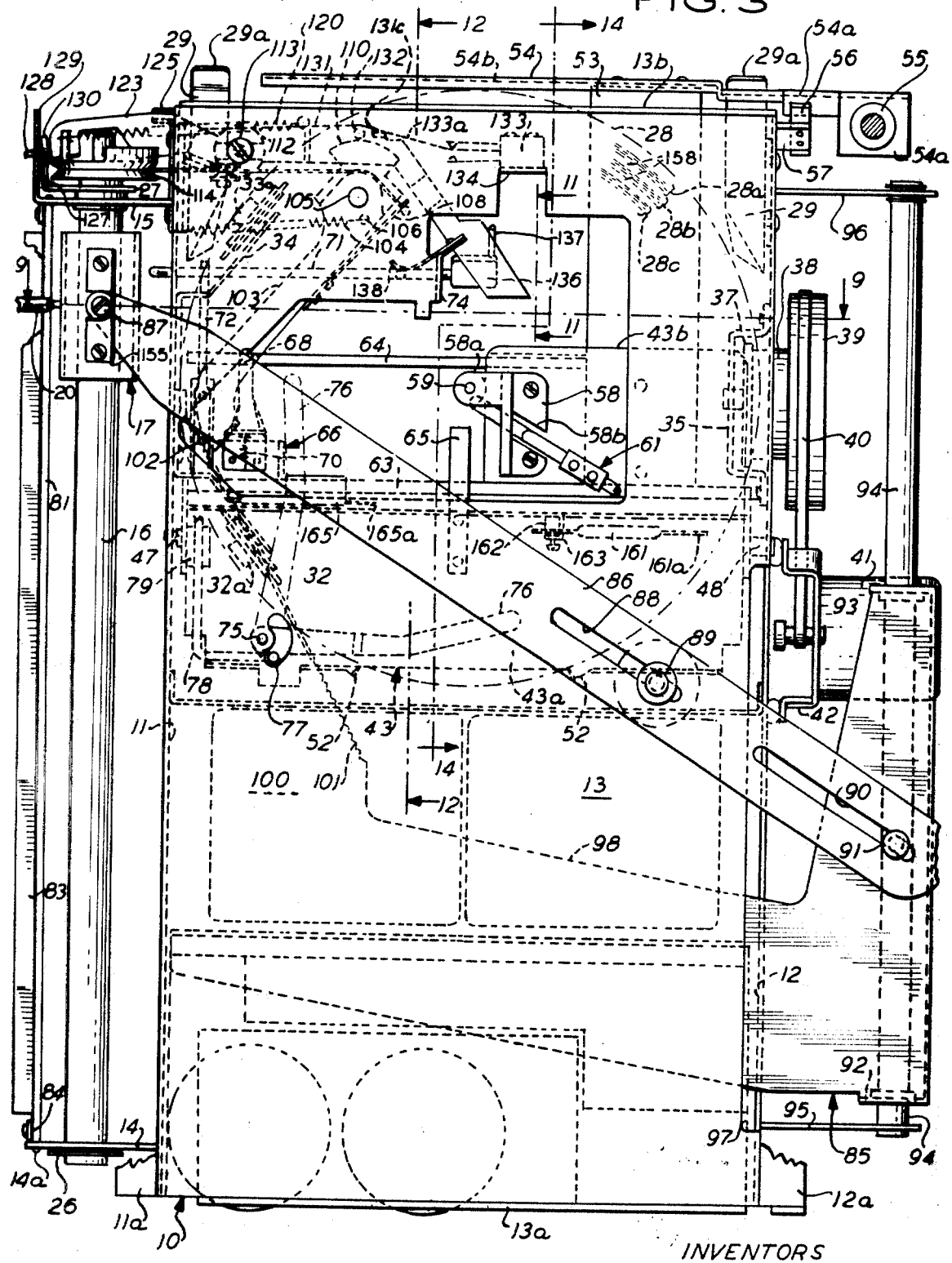

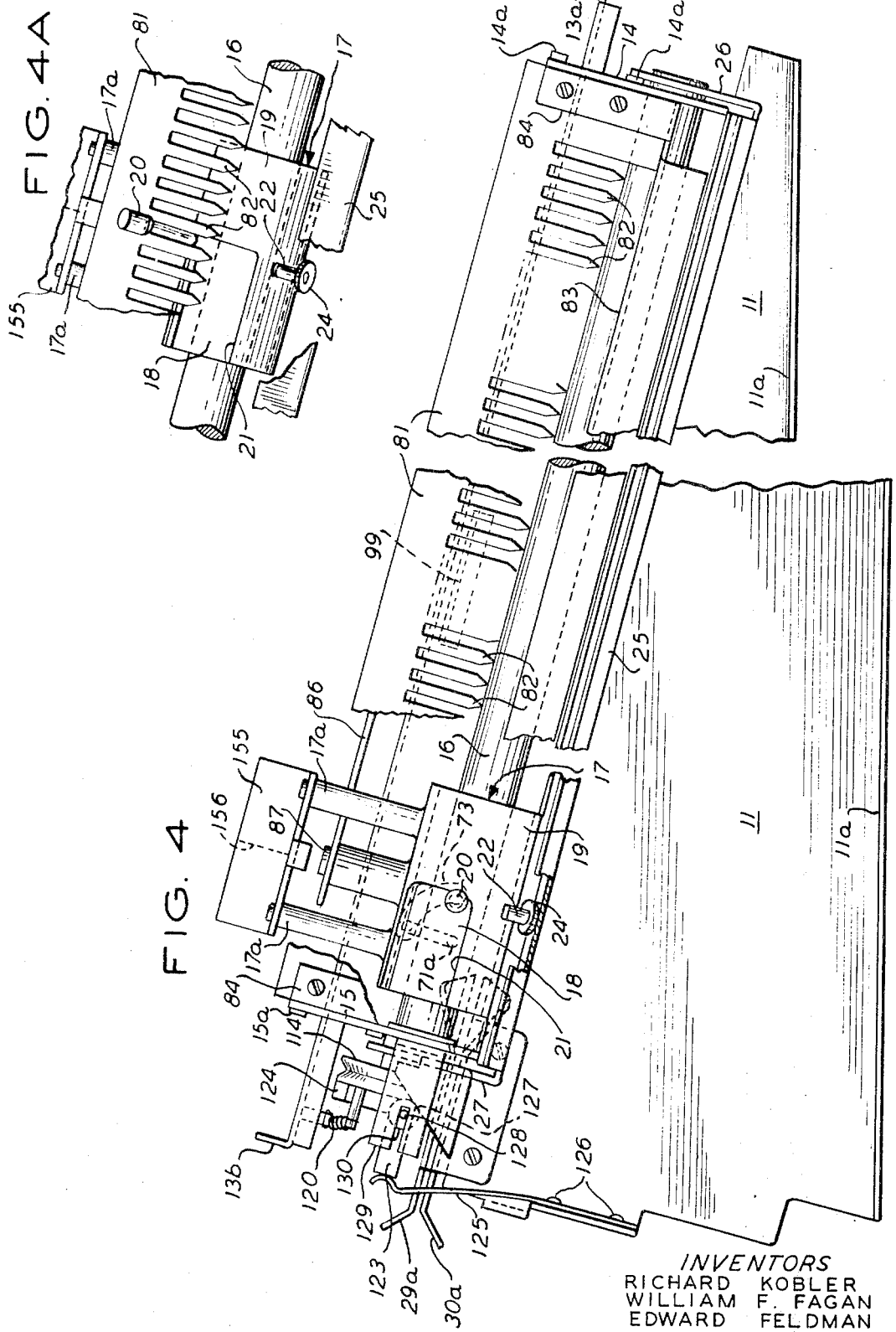

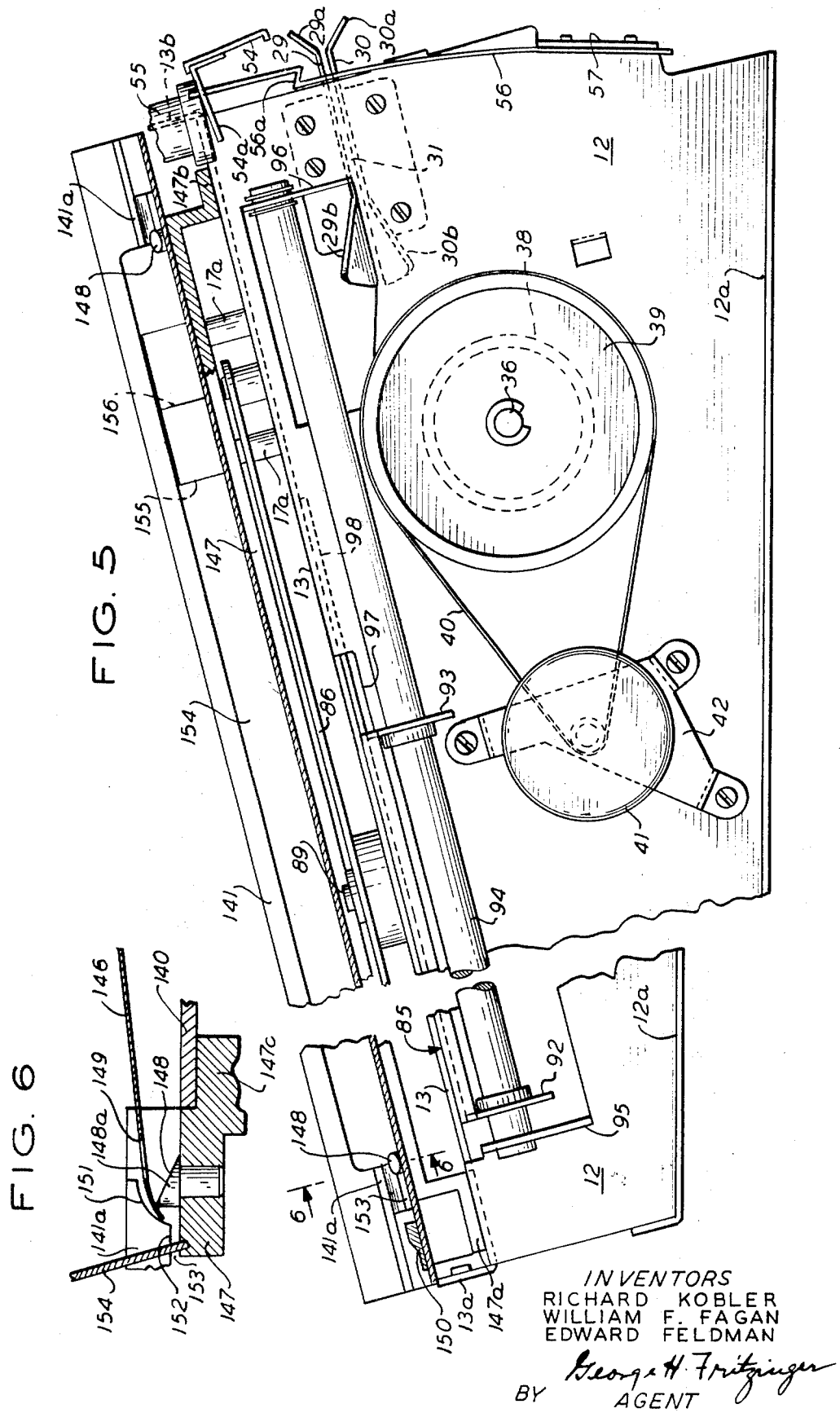

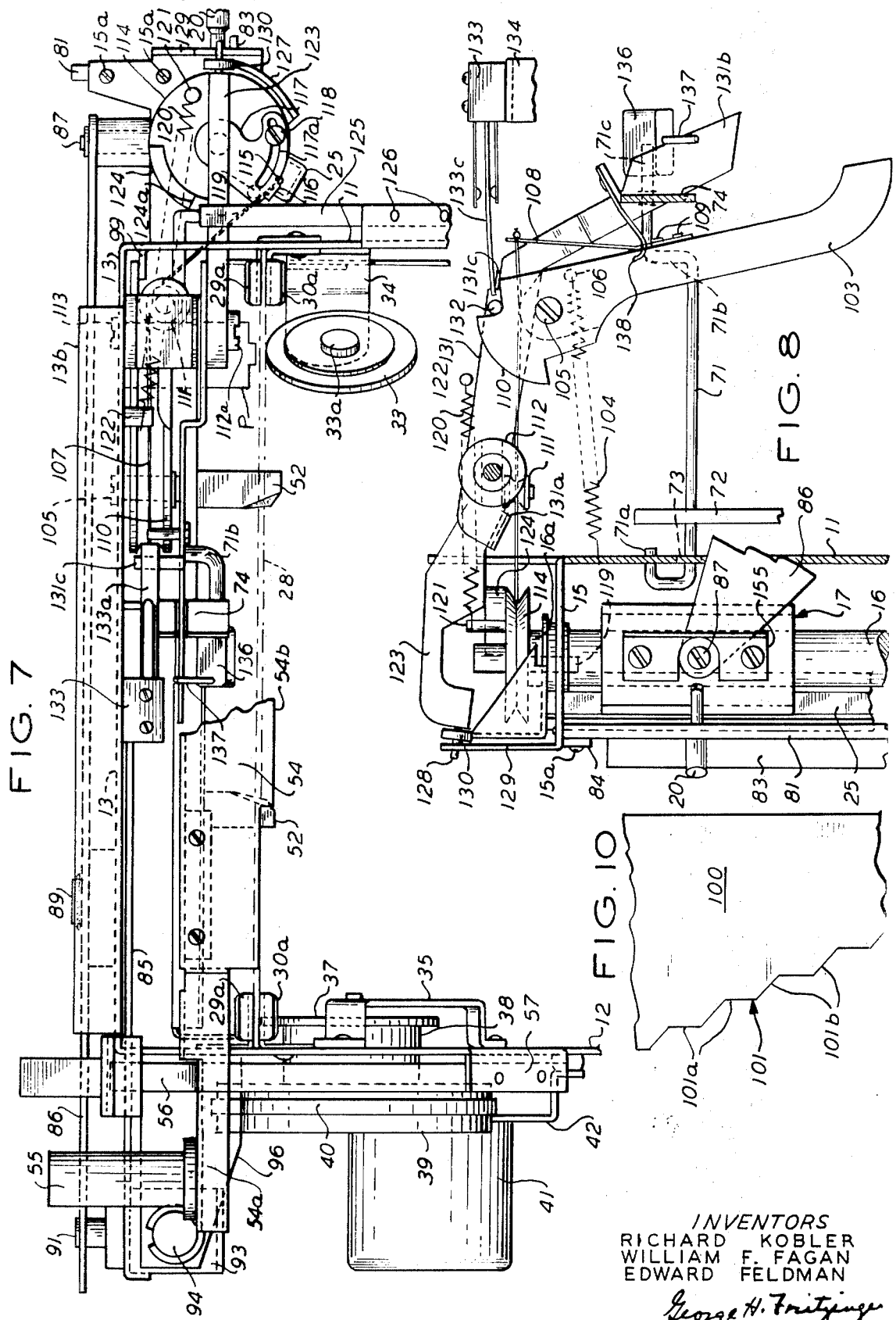

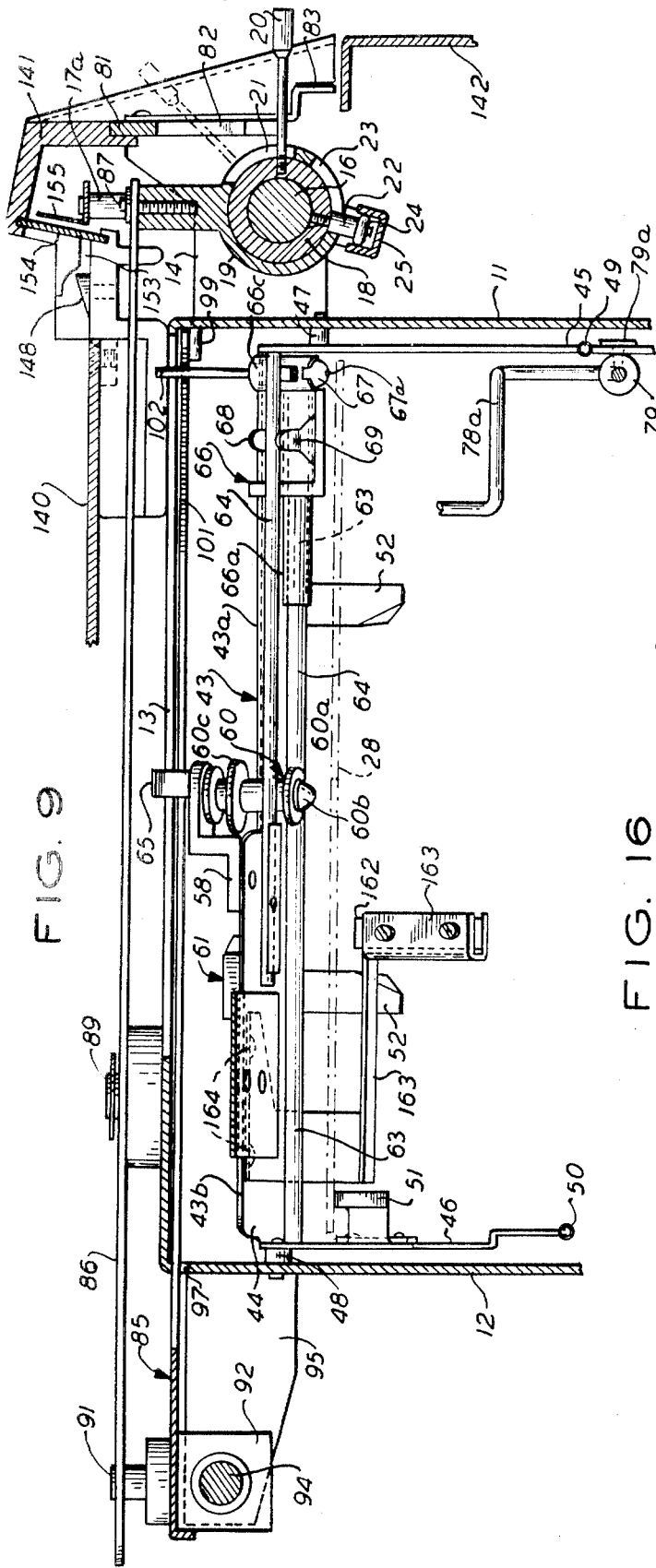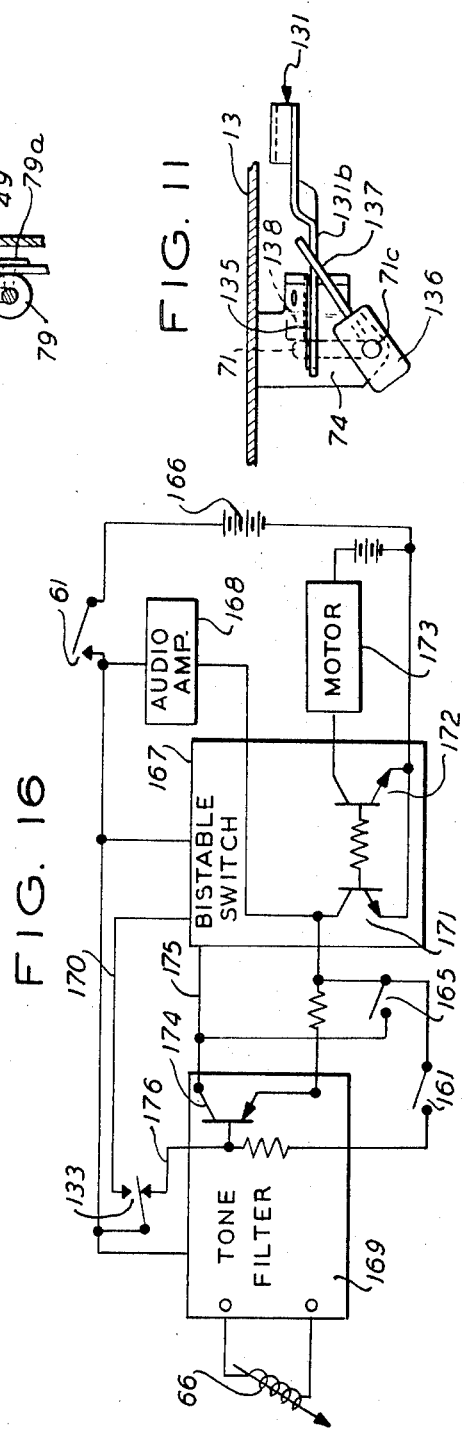
INVENTORS
RICHARD KOBLER
WILLIAM F. FAGAN
EDWARD FELDMAN
BY *George H. Fritzinger*
AGENT June 23, 1970  R. KOBLER ET AL  3,516,175

PHONOGRAPHIC AUDIO-VISUAL TEACHING MACHINE

Filed March 13, 1968  9 Sheets-Sheet 7

INVENTORS
RICHARD KOBLER
WILLIAM F. FAGAN
EDWARD FELDMAN

BY George H. Fritzinger
AGENT

June 23, 1970 R. KOBLER ET AL 3,516,175
PHONOGRAPHIC AUDIO-VISUAL TEACHING MACHINE
Filed March 13, 1968 9 Sheets-Sheet 8

INVENTORS
RICHARD KOBLER
WILLIAM F. FAGAN
EDWARD FELDMAN

George H. Fritzinger
BY AGENT

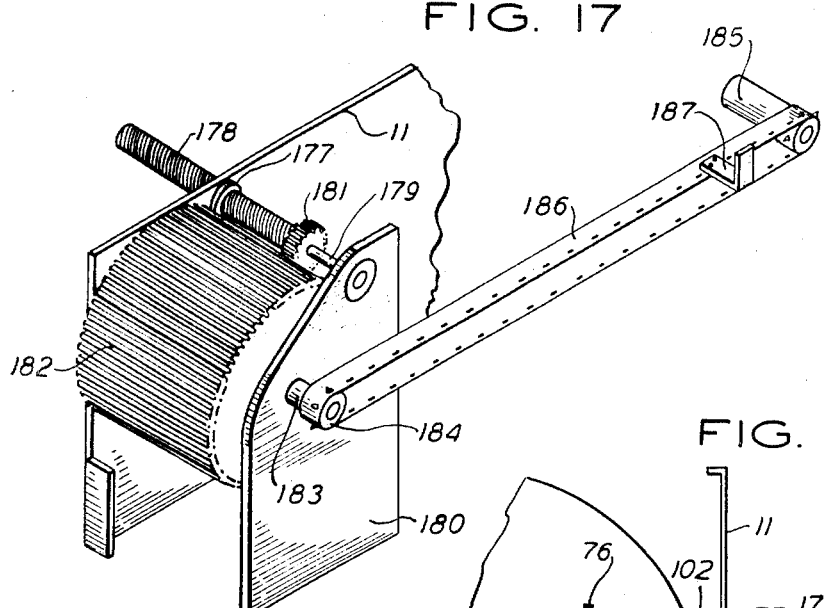
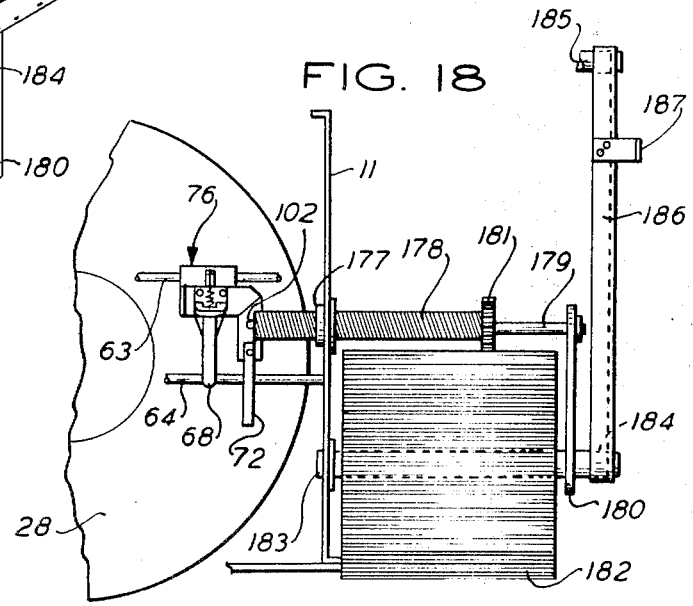
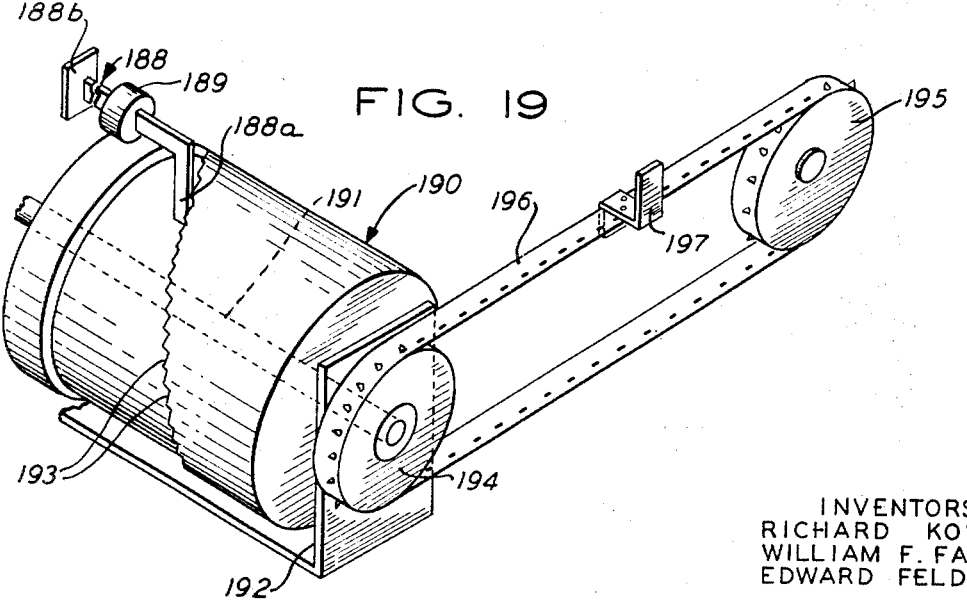
INVENTORS
RICHARD KOBLER
WILLIAM F. FAGAN
EDWARD FELDMAN United States Patent Office 3,516,175
Patented June 23, 1970

3,516,175
PHONOGRAPHIC AUDIO-VISUAL TEACHING
MACHINE
Richard Kobler, West Orange, William F. Fagan,
Rochelle Park, and Edward Feldman, Teaneck,
N.J., assignors to McGraw-Edison Company,
Elgin, Ill., a corporation of Delaware
Filed Mar. 13, 1968, Ser. No. 712,821
Int. Cl. G09b 1/00; G11b 31/00
U.S. Cl. 35—8          30 Claims

ABSTRACT OF THE DISCLOSURE

A random access audio-visual phonographic machine is provided for reproducing portions of a sound record according to the positioning of a manual index head carrying a pointer along a printed page mounted on the machine. The printed page may be an individual program sheet or a page of a book or manual. The record is prerecorded in separate bands with a sound intelligence coordinated with the respective visual items on the printed page. The blank spaces between successive recorded bands are bridged by spiral lead-in grooves. The index head can be latched in any of a series of equally spaced indexing positions. When the index head is unlatched and reset the machine is stopped and the reproducer head is lifted and shifted back to the blank space ahead of the recorded band corresponding to the setting of the index head. In this unlatched position the reproducer head and pointer can be shifted along the edge of the page. When the index head is latched, the reproducer head can be freed for advance travel from its indexed position, the machine started and the reproducer head lowered on the record. The machine is stopped automatically at the end of each band by a prerecorded stop signal on the record.

CROSS REFERENCES TO RELATED APPLICATION

The present teaching machine is operable with a learning disk record having a magnetically soft interliner or with a conventional disk record having no such interliner according to whether the machine is to be used for playing selected subdivisions of the record or the whole of the record. Such learning disk records are preferably of the type disclosed in the pending Kobler et al. application, Ser. No. 689,714, filed Dec. 11, 1967.

BACKGROUND OF THE INVENTION

The present machine is especially useful in teaching any subject wherein the learning process involves printed subject matter and is aided by an auditory supplement such as a pronunciation, description, explanation, etc. As will be apparent, the machine is an important adjunct in the teaching of foreign languages.

The closest prior art known to the applicants is Runyan, Pat. No. 1,930,286, dated Oct. 10, 1933, and entitled Educational Apparatus, and Kantrowitz, Pat. No. 3,086,297, dated Apr. 23, 1963, and entitled Talking Book. The machines described by these patents do not permit flexible programming of audio messages relative to the different visual items because the machines are not designed for unlimited playing of varying subdivisions of a sound record from any start point to any stop point up to the end of the record. Also, in the Kantrowitz patent the reproducer head is moved against a return spring during its tracking engagement with the record, in order to restore a coupling of the reproducer head with the indexing lever when the head is raised from the record. In the Runyan patent, the reproducer head is uncoupled from the indexing selector as the head is lowered on the record, but the indexing selector is left free to be moved during playing with the result that the index selector must then be scanned to pick up the reproducer head. Further, these machines are not wholly foolproof against stylus and record damage and misoperation in the hands of unskilled operators.

SUMMARY OF THE INVENTION

The present machine is a precision one operable from high density recordings and having an index selector mechanism enabling accurate groove selection at the start points across the record. When the machine is placed in play conditions, the reproducer head is released from the index mechanism for free unrestrained tracking engagement with the record from the selected start point to any desired stop point predetermined only by a stop signal on the record. The index mechanism comprises a stepped cam movable across the path of the head carriage by a manual index head, and a spring-biased carriage return lever which is released to return the carriage from any advanced position to the precise start position determined by the cam when the machine is shifted into a repeat condition and which maintains the carriage in camming engagement with the stepped cam during scanning. In play and repeat conditions of the machine, the index head is latched to prevent any accidental displacement thereof. The shifting between play and repeat conditions is by a toggle-type mechanism permitting no inbetween conditions.

Objects of the invention are to provide a sturdy, economical and precision machine for teaching purposes controlled in a simple manner and foolproof against misoperation, to provide such machine which permits the playing of variable portions of a sound record running from any selected start point and ending at any desired stop point determined solely by a prerecorded stop signal on the record, to provide such machine which receives program sheets or a book in a reading position and plays selected portions of a prerecorded record responsive to shifting an index head to an index mark along the sheet or book and then latching the index head, and to provide such machine which is conditioned automatically for playing selected subdivisions of a sound record or the whole of the record according to whether or not the record is provided with a magnetically soft interliner.

These and other objects and features of the invention will be apparent from the following description and the appended claims.

In the description of our invention reference is had to the accompanying drawings, of which:

FIG. 3 is a top plan view of the mechanism of the machine shown in scan condition for shifting the translating head across the record disk;

FIG. 4 is a left elevational view, with portions broken away, of the mechanism shown in FIG. 3;

FIG. 4A is a left elevational view of a portion of the mechanism broken away in FIG. 4;

FIG. 5 is a right elevational view of the mechanism shown in FIG. 3;

FIG. 6 is a fractional sectional view taken on the line 6—6 of FIG. 5;

FIG. 7 is a rear elevational view of the mechanism shown in FIG. 3;

FIG. 8 is a fractional top plan view of the machine with the top plate cut away showing the machine in play condition;

FIG. 9 is a fractional sectional view taken on the line 9—9 of FIG. 3;

FIG. 10 is a fractional view to enlarged scale of a portion of the indexing plate for the head carriage;

FIG. 11 is a fractional section on the line 11—11 of FIG. 3;

FIG. 16 is a schematic circuit diagram of the control apparatus of the machine;

FIGS. 17 and 18 are perspective and plan views showing an alternative index mechanism of a drum gear type operated by the index head for locating the head carriage in respective start positions; and FIG. 19 is a perspective view showing still another index mechanism of a drum-cam type for locating the head carriage in its start positions.

Figure 1:
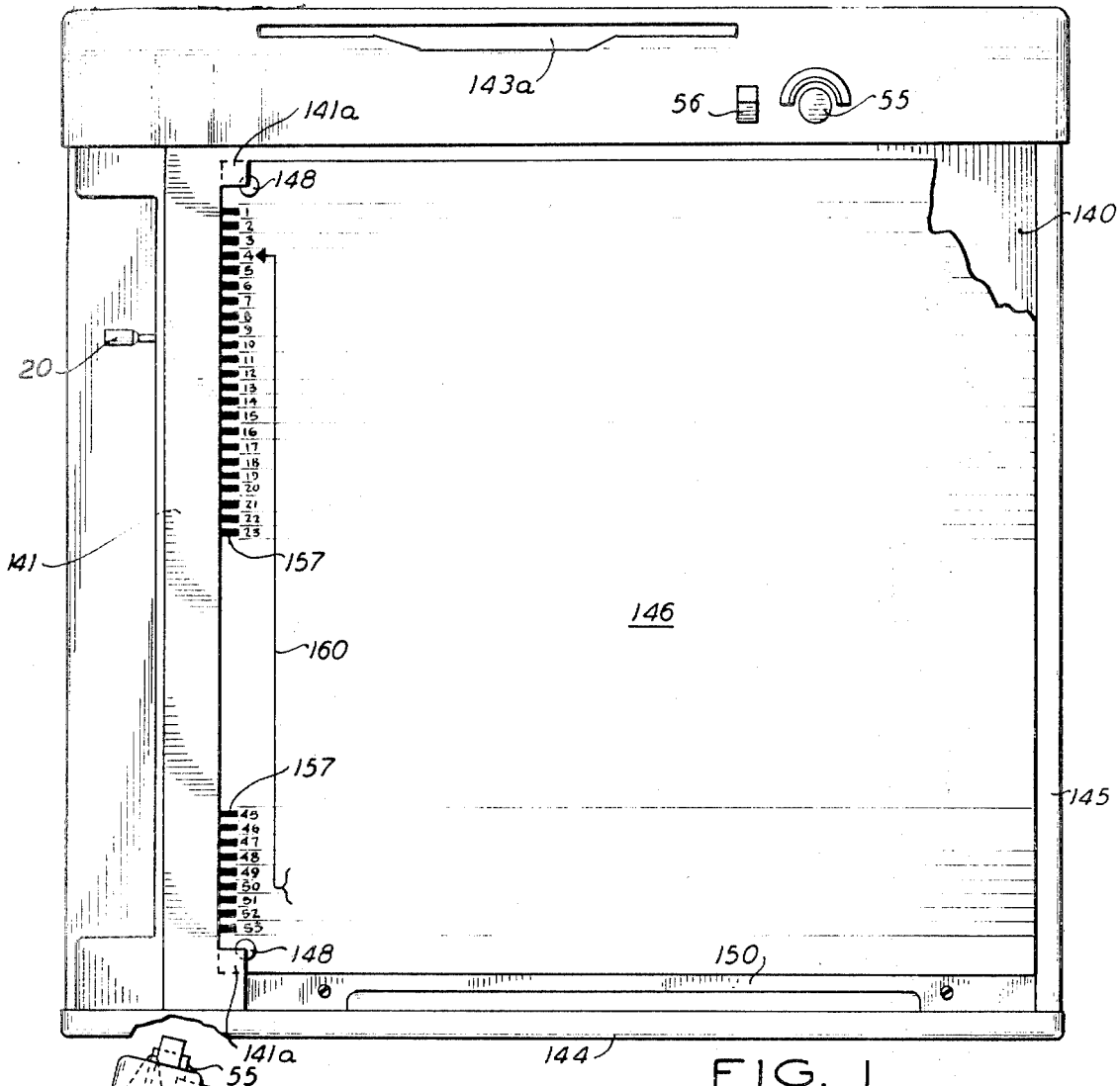
FIG. 1 is an exterior top plan view of the teaching machine showing a program sheet mounted thereon partly broken away.

The present teaching machine has a one-piece sheet metal chassis or frame 10 comprising left and right side plates 11 and 12 inclined downwardly from back to front and joined at the top by a downwardly slanting top plate 13. The side plates have outwardly bent mounting flanges 11a and 12a at the bottom, and the top plate has upwardly bent flanges 13a and 13b at the front and back. Struck from the front and back of the left side plate 11 are side lugs 14 and 15 which are apertured to receive the end portions of a rod 16 running the length of the machine. Slidably mounted on this rod is an index head 17 (FIGS. 3, 4, 8 and 9) comprising a bushing 18 surrounded by a sleeve 19. Secured to the bushing is an index handle 20 extending off to the left of the machine through a clearance opening 21 in the sleeve. Also, threaded into the bushing is a stud 22 extended downwardly through a clearance slot 23 in the sleeve. A roller 24 is journaled on this stud and received in a channel bar 25 running the length of the rod 16. The channel bar has apertured end lugs 26 and 27 forming what is herein termed the scan bail. These lugs 26 and 27 are journaled on the rod 16. Thus, the index head is free to be moved the length of the rod 16 while retaining a spline-type connection with the scan bail to enable the bail to be turned about the rod by the index handle 20. It is by sliding movement of the index head along the rod to indexing positions that selections are made from a phonograph record disk 28, and it is by turning movement of the index handle at each selected indexing position that the machine is shifted between on-off or play-scan conditions, as will appear.

Mounted at the back of the machine on each inside wall of the left and right side plates 11 and 12 is a pair of upper and lower guide brackets 29 and 30 for guiding the disk record into and from its loading position in the machine (FIGS. 3, 5, 7, 12, 13, 14 and 15). Each pair of guide brackets has inwardly turned flanges in spaced parallel arrangement to form a guide slot 31 therebetween for receiving the disk record. The flanges have oblique lugs 29a and 30a at their back ends which are flared outwardly from each other to assist in the direction of a disk record into the guide slots. Also, the flanges have similar lugs 29b and 30b at their inner ends to avoid any sharp edges which might cut into the rotatable disk record when the same is being removed.

Mounted also at the left side of the machine on the inner wall of the left side plate 11 is a pair of front and back rollers 32 and 33 (FIGS. 3, 7, 12 and 13) for supporting the disk record at a level midway the adjacent guide slot 31. These support rollers are journaled on axes radial to the mounted disk record as on studs 32a and 33a staked to a wing-shaped bracket 34 secured to the side plate 11. A post P depends from the top plate 13 nearly to the top of the roller 33 to permit only one disk record to be mounted in the machine.

Mounted on the inner wall of the right side plate 12 is a bracket plate 35 supported by three legs riveted to the side plate. Staked to this bracket plate is a shaft 36 parallel with a diameter line of the mounted record. Journaled on this shaft is a rubber-tired drive wheel 37 which engages the underside of a rim portion of a mounted disk record for rotating the same (FIGS. 3, 5, 7, 14 and 15). The drive wheel 37 has a hub extending through a clearance opening 38 in the right side plate 12. Secured to the outer end of this hub is a relatively large pulley 39 coupled by a belt 40 to a drive motor 41. The drive motor is end mounted on a bracket plate 42 supported in spaced parallel relation to the outer wall of the side plate 12 by three legs secured to the side plate.

After a disk record is inserted through the guide slots 31 into the machine it is centered in a correct mounted position by depressing a load plate 43 above the disk record. The load plate comprises a forward section 43 overlying the front one-quarter of a mounted record and spanning the distance between the side frame plates 11 and 12. Integral with the forward section 43a is a rearward righthalf section 43b stepped down at 44. The section 43b extends just past the center of the record. Turned downwardly from the forward section 43a are left and right side arms 45 and 46 which are pivoted near the load plate on studs 47 and 48 pressed to the side plates 11 and 12. Tension springs 49 and 50 are connected between the lower ends of these arms and respective lugs struck inwardly from the side plates to bias the load plate into an unoperated position inclined upwardly from the front to the rear of the machine relative to the top plate 13. Secured to the right side arm 46 is a shoe 51 which is offset inwardly and extended past the drive wheel 37. This shoe is at a level slightly above the drive wheel when the load plate 43 is in unoperated position to aid in guiding a record past the drive wheel as it is inserted into the machine. Depending from the front edge of the load plate are two stop lugs 52 which form abutments against which a disk record is stopped in an approximately centered position when it is inserted into the machine. A handle 53 is secured to the load plate section 43b and extended rearwardly of the machine. Secured to an upturned lug at the rear end of the handle 53 is a cross member 54 having an arm 54a extending to the right of the machine which is depressible by a push button 55 and having a leftwardly extending arm 54b which forms a guard or shutter to close off entrance to the guideways 31 when the push button 55 is depressed to shift the load plate into operated position. As the load plate is depressed about the pivots 47 and 48 into its operated position a cantilever spring 56 which is secured to a lug 57 on the right side plate 12 and which has an offset near the top forming a catch 56a is snapped over the arm 54a to latch the load plate. As the load plate is rocked downwardly into its operated position the shoe 51 and the stop lugs 52 are moved out of contact from the mounted record and the record is finally centered as is herein next described.

Figure 14:
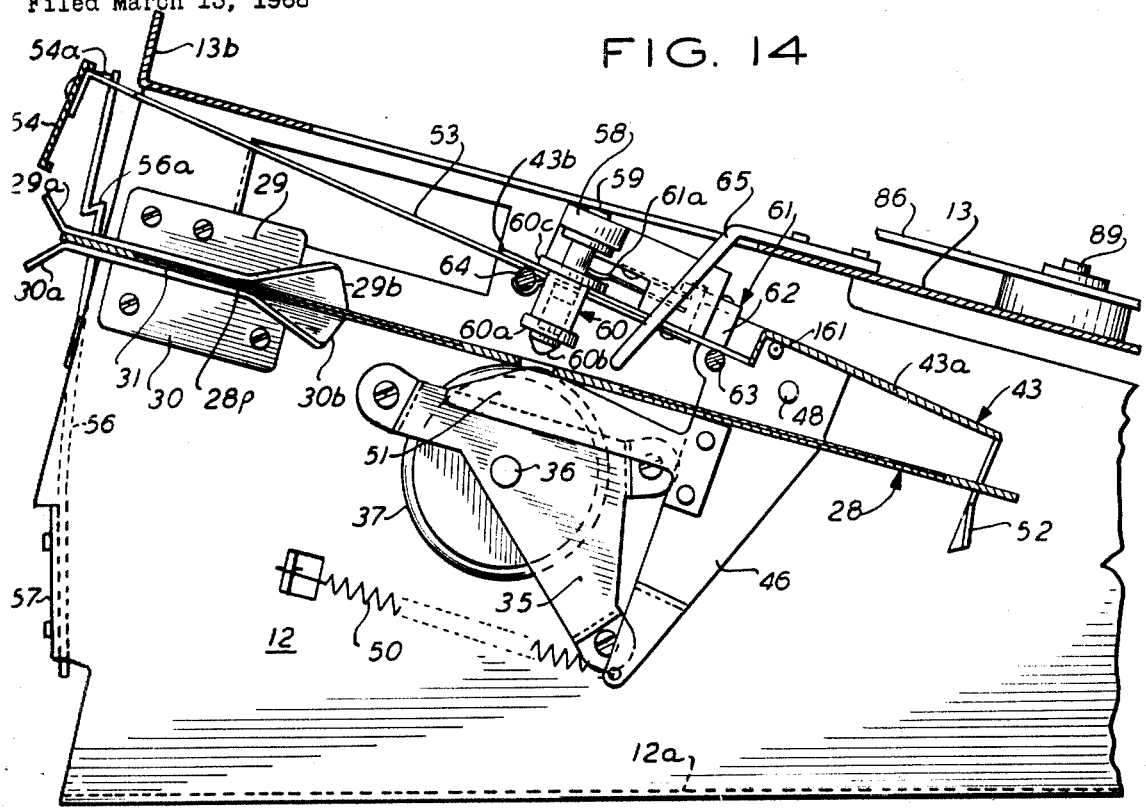
FIG. 14 is a fractional section taken on the line 14—14 of FIG. 3 showing the record disk disengaged from the centering mechanism.
Figure 15:
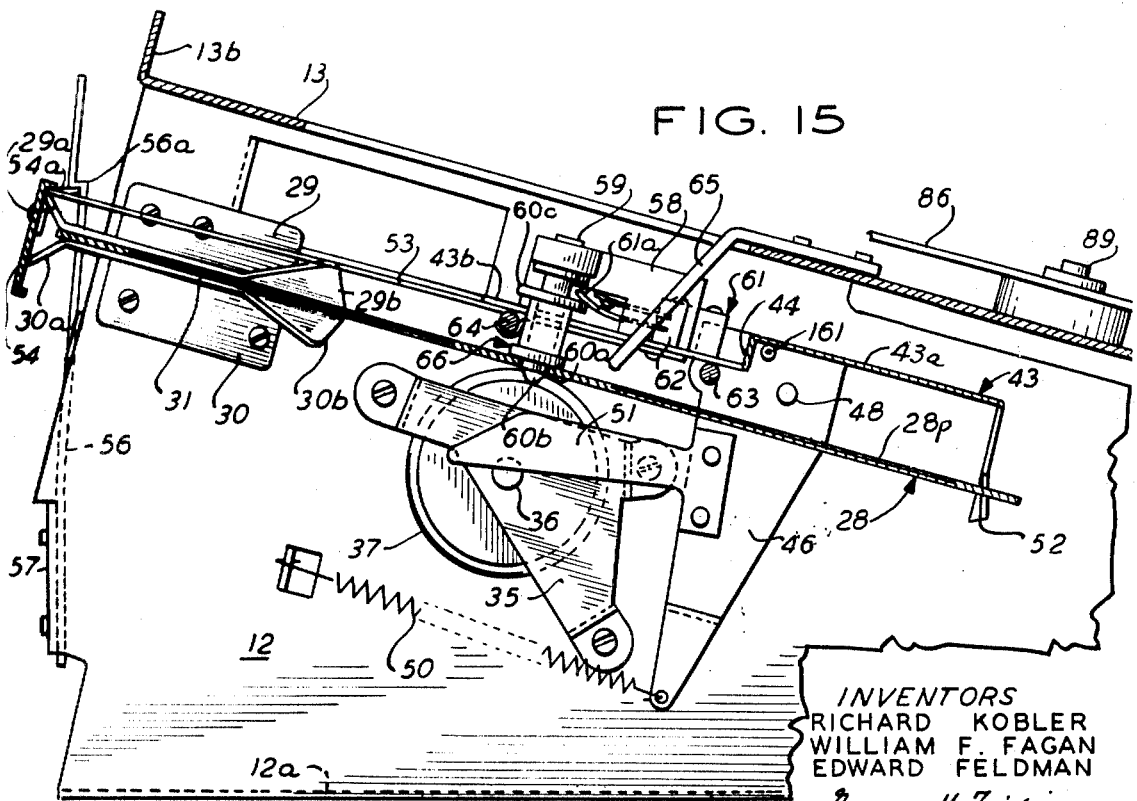
FIG. 15 is another view as shown in FIG. 14 but showing the record disk engaged with the record centering mechanism.

Secured to the rear section 43b of the load plate is an L-shaped bracket 58 having an arm 58a extending past the left side edge of this section. Staked to this arm at the exact center of a mounted record is a depending pin 59, and mounted rotatably on this pin is a record-centering spindle 60 having a shoulder 60a near the bottom and a coned tip 60b extending past the shoulder. A top flange 60c on the roller abuts against an edge of the load plate section 43b to retain the roller on the pin. A normally open load switch 61 for detecting the presence of a mounted record comprises a pair of contact springs mounted in an insulating stack 62 on the top of the load plate section 43b. The pole member 61a of this switch extends through a central clearance opening 58b in the L bracket 58 and bears down on the top flange 60c of the centering spindle. When a disk record is inserted in the machine and the load plate is then pressed down by the finger piece 54 into its latched operated position, the cone tip 60b is moved into the center hole of the disk record until the cylindrical portion of the spindle just below the shoulder 60a engages the center hole and thereupon the abutment of the shoulder 60a against the record causes a relative upward displacement of the centering spindle relative to the load plate to move the load switch 61 into its closed position. The downward pressure which the centering spindle still exerts on a mounted record aids in maintaining a frictional driving engagement of the record with the drive wheel 37. When the latch spring 56 is pressed forwardly to unlatch the load plate and cause it to be snapped upwardly into unoperated position by spring action, a stripping finger 65 mounted on the top plate 13 and depending downwardly to a point near the centering spindle 60 abuts against the disk record to strip it off of the centering spindle and thereby free the record to be withdrawn from the machine. (FIGS. 3, 9 and 14.)

Figure 12:
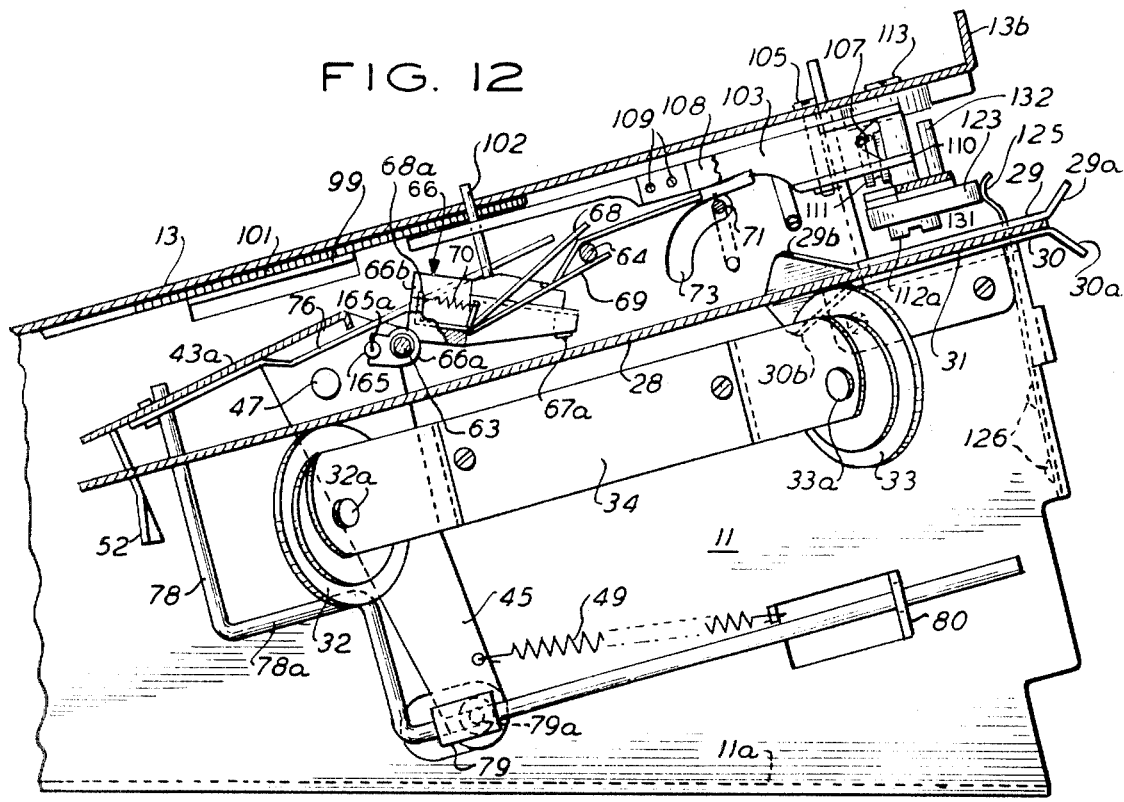
FIG. 12 is a fractional section on the line 12—12 of FIG. 3 showing the machine in scan condition and the record disk disengaged from the record centering mechanism.
Figure 13:
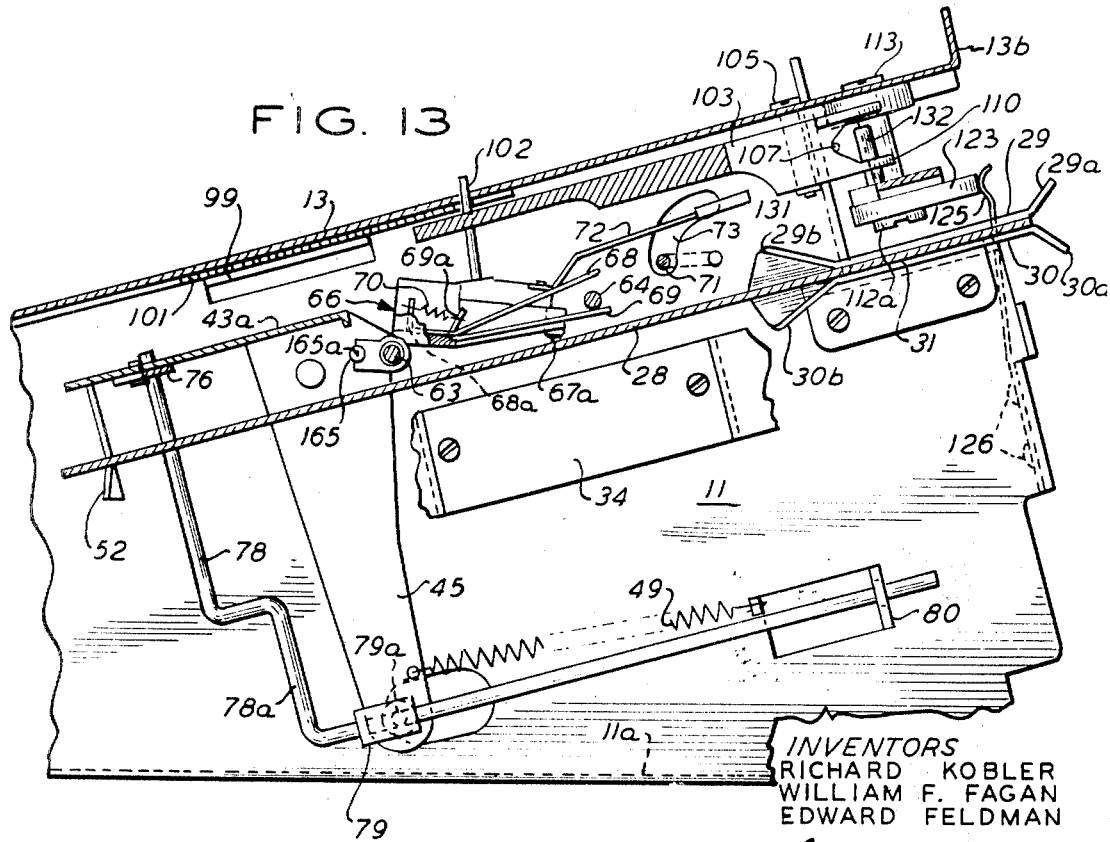
FIG. 13 is another view as shown in FIG. 12 but with the machine in play condition and the record disk engaged with the record centering mechanism.

The load plate carries a transverse rod 63 just to the rear and below the front section 43a, which is engaged at its ends in the side arms 45 and 46. Clamped to the underside of the rear section 43b of the load plate is a second parallel rod 64 (FIGS. 3, 9, 12, 13 14 and 15). Slidably mounted on the front rod 63 is a head carriage 66 of a molded construction comprising a transverse tubular member 66a embracing the rod 63, a channel bar section 66b extending rearwardly from the tubular member and a hollow arm 66c of a half circle in cross section open at the bottom (FIG. 9) extending rearwardly from the left side of the channel bar. Mounted in the hollow arm 66c is a reproducer head 67 having a stylus 67a at its rearward end. Riveted to the bottom of the channel bar section 66b is a narrow finger 68 the rearward tip of which overlies the back cross rod 64. Below the finger 68 is a second finger 69 the rearward tip of which underlies the cross rod 64. The second finger has a slotted turned up lug 69a at its base (FIGS. 3 and 13) which embraces the first finger and forms a pivot thereon. A tension spring 70 is connected between the lug 69a and a lug 68a turned up from the base of the finger 68. This spring biases the second finger upwardly against the cross rod 64 to bias the head carriage downwardly—i.e., clockwise as seen in FIGS. 12 and 13—to a limit position determined by the abutment of the finger 68 against the rod 64.

When the load plate 43 is in a raised or unoperated position the rod 64 holds the reproducer head in a raised position above the disk record. As the load plate is moved downwardly into its latched or operated position, the cross rod 64 is lowered out of contact with the finger 68 at the instant the stylus engages the record. Further, at that instant tracking pressure of the stylus against the record is obtained by the spring 70 pressing the arm 69 upwardly against the underside of the cross rod 64 (FIG. 13). The reproducer head may however be raised and lowered from and onto the disk record while the load plate is latched in operated position by means of a lift bail 71 and a cooperating lift arm 72 secured to and extending rearwardly from the arm 66c of the head carriage. The left end portion of the lift bail extends through an arcuate clearance 73 in the side plate 11 (FIG. 4) and is then turned back on itself to form a pivot 71a in the side plate. The rightward portion of the lift bail at a point beyond the travel range of the lift arm 72 is offset at 71b (FIG. 8) to form a rightward extension 71c in line with the pivot 71a, which is pivoted in a lug 74 bent downwardly from the top plate 13. The lift bail is controlled by the index handle 20 as the machine is shifted between its scan and play conditions, as is hereinafter described.

Pivoted at 75 to a left forward portion of the front section 43a of the load plate is a carriage return lever 76 which extends obliquely to the right of the head carriage as indicated by its unoperated and operated positions indicated in FIG. 3. Pivotally engaging a hub portion of the lever 76 at a point 77 to the front and right of the pivot 75 is the vertical end portion of a control rod 78. This control rod extends downwardly from the pivot 77 and is then offset to the left and bent rearwardly at 78a (FIGS. 9 and 12) to extend past the lower end portion of the left arm 45 of the load plate. A sleeve 79 is secured on the control rod and pivoted at 79a to the lower end portion of the side arm 45. The control rod however extends further rearwardly beyond the sleeve 79 and is received slidably by an apertured guide lug 80 struck inwardly from the left side plate 11. Since the control rod is secured to the lower end portion of the left side arm 45 at a considerable distance from the pivot stud 47 of the load plate, the control rod is shifted rearwardly as the load plate is raised to unoperated position and is shifted forwardly as the load plate is pressed downwardly into its operated position. This movement of the control rod relative to the load plate causes the return lever 76 to be swung counterclockwise against the head carriage (from its dotted position to its dash-dot position shown in FIG. 3) to return the head carriage to a start position when the load plate is returned to unoperated position to free a mounted record for removal from the machine. Conversely, when the load plate is pressed into its operated position the return lever 76 is swung clockwise out of the path of the head carriage to free the carriage for tracking engagement with the rotating disk record.

Mounted lengthwise of the machine at the left side thereof between the side lugs 14 and 15 is a latch comb 81 secured by end screws 14a and 15a which traverse the lugs and thread lengthwise into the end walls of the comb. The comb has a series of downwardly extending teeth 82 with slots therebetween for receiving selectively the shank of the index handle 20. Below the latch comb at a spacing from the ends of the teeth 82 is a ledge 83 supported at its ends by lugs 84 secured to the end portions of the comb. This ledge forms a lower stop for the index handle. When the index handle is in a horizontal position herein referred to as its "scan" position it clears both the stop ledge and the bottom points of the teeth 82 to allow the index head to be shifted at will along the rod 16 without obstruction. In order to permit the index handle to be turned upwardly into the comb at any position except at dead-center positions relative to the pointed ends of the latched teeth, the lower portions of the latched teeth are curved to points. Typically, the latch comb may have fifty-two equally spaced teeth with intervening slots just wide enough to receive freely the index handle. Thus, whenever the index handle is just off from a dead-center position it can be shifted upwardly into the comb into a play position with a resultant automatic camming of the index head into a position at a multiple step distance along its range of travel from its end position at the back end of the machine. The stop ledge 83 and the upper ends of the slots of the latch comb serve as stop positions for the index handle to prevent the pupil from exerting any undue force on the control mechanism of the machine.

A movement of the index head 17 along the rod 16 operates a pantograph to define a series of start positions for the head carriage across the disk record running from the outer rim thereof as the index head is shifted forwardly through its successive latched positions from its rearward end position. The pantograph comprises a carriage indexing plate 85 operable by a lever 86 pivoted at 87 to a post upstanding from the sleeve 19 of the index head. The lever 86 has an intermediate slot 88 (FIG. 3) lengthwise thereof received slidably by a stud 89 staked to the top plate 13, and had another slot 90 lengthwise thereof in its right end portion received slidably by a stud 91 staked to the carriage indexing plate 85. The carriage indexing plate has two downwarly bent lugs 92 and 93 apertured to slidably embrace a support rod 94 at the right side of the machine whereby to provide a mounting for the indexing plate permitting movement thereof parallel with that of the index head. The support rod 94 is carried by lugs 95 and 96 struck outwardly from the right sidewall 12 of the frame. A long slot 97 (FIG. 5) in the sidewall 12 provides clearance for extension of an arm 98 of the indexing plate in the space below the top plate 13 between the left and right side plates 11 and 12. A ledge 99 is lanced inwardly from the left side plate 11 to support slidably the arm 98 at its left end. (FIGS. 4, 7 and 9). By the pantograph action of the lever 86 the carriage indexing plate 85 is moved in correspondence with the index head but to a lesser scale by a ratio of the distance between the studs 89 and 91 to the distance between the pivot 87 and the stud 89.

The arm 98 of the indexing plate has a rearward triangular extension 100 in the form of a right triangle. The hypotenuse of this triangle is a stepped edge 101 extending past the left side of an upstanding pin 102 on the head carriage (FIG. 3). The base of the triangle is to the front of the head carriage and has a length at least equal to the length of travel of the head carriage. The stepped edge 101 comprises a series of parallel steps 101a (FIG. 10) joined by oblique risers 101b. The steps 101a correspond to the latched positions of the index head and are so located that at each latched position the pin 102 is in line in the direction of travel of the head carriage with a corresponding step on the indexing plate. When the index handle is shifted to its scan position a carriage return or shift lever 103 is released and moved by a spring 104 against the right side of the pin 102 to return the head carriage to a start position determined by abutment of the pin 102 against a step 101a unless the head carriage is already in such start position. Further, the carriage shift lever 103 will maintain the pin 102 in camming engagement with the stepped edge 101 as the index plate 85 is moved by the index head. By this camming engagement of the pin 102 against the stepped edge 101 the head carriage is shifted by steps across the disk record in correspondence with the movement of the index head past its respective latched positions. In order that this stepped movement of the head carriage will be relatively smooth the length of each step is made only approximately as long as the radius dimension of the pin 102. When the index handle 20 is raised from scan position to play position to latch the index head the shift lever is swung counterclockwise (FIG. 3) out of the pathway of the pin 102 to free the head carriage for tracking engagement of the stylus with the rotating record, as is herein next described.

The shift lever 103 is pivoted at 105 to the underside of the rearward left hand portion of the top plate 13. The tension spring 104 is connected at one end to a pin 106 staked to the shift lever just to the front of the pivot 105 and its other end to the left side plate 11. A coupling is provided to turn the shift lever out of the path of the head carriage when the index handle 20 is shifted to play position. This coupling comprises a flexible braided wire cord 107 connected at one end to the shift lever through a cantilever type take-up spring 108 secured by screws 109 to the right side of the lever intermediate of the length thereof. The cord 107 leads from the spring 108 partially around a grooved sector-shaped hub 110 of the shift lever, then across a guide roller 111 journaled on a stud staked to a post 112 secured by a screw 113 to the underside of the top plate 13, and next to the underside of a grooved pulley 114 journaled on a reduced diameter end portion 16a of the support rod 16 for the index head. A steel ball 115 is secured to the end of the cord 107 and is wedged in the groove of the pulley 114 against a lug 116 of a bracket 117 on the pulley. The bracket 117 pivots on the reduced end portion 16a and is adjustably secured to the pulley 114 by a headed screw 118 passing through an arcuate slot 117a in the bracket and threading tightly into the pulley. The index handle 20 is coupled positively to the pulley 114 in the downward movement thereof from play to scan positions by abutment of the scan bail 25 against a drive pin 119 staked to the inner side of the pulley. A tension spring 120 is connected between a pin 121 on the pulley 114 and a stud 122 on the underside of the top plate 13 to bias the pulley counterclockwise (FIG. 7) and thus to tend to maintain the drive pin 119 in engagement with the scan bail. In the clockwise movement of the pulley 114 which it receives as the index handle is moved from play to scan positions the cord 107 is relaxed to allow the carriage shift lever 103 to slap against the pin 102 on the head carriage and return the carriage to a start position determined by the index plate 85.

The return movement of the pulley 114 as the index handle is moved to play position is controlled to occur in two steps by means of a pulley lock lever 123 and a cooperating catch member 124 on the pulley. The pulley lock lever is pivoted at 112a (FIG. 7) to the lower end of the post 112 and extends diametrically past the rear face of the pulley 114. The catch member 124 is an integral arcuate extension on the back face of the pulley 114 provided with a step 124a at its counterclockwise end (FIG. 7). The lock lever 123 is biased into engagement with the catch member 124 by a cantilever spring 125 secured at 126 to the left end wall 11. During movement of the index handle 20 from scan to play position the lock lever is moved rearwardly by a cam 127 secured integrally to the rear lug 27 of the index bail 25. The cam 127 extends past the periphery of the pulley 114 and is arcuate to have a fixed spacing therefrom. On the lock lever 123 is an end pin 128 guided in a slotted arm 129 extending rearwardly from the outer end of the lug 115 of the frame. Journaled on this pin between the arm 129 and the end of the lock lever is a roller 130 which rides on the cam 127.

As the index handle 20 is moved downwardly from play position the cam 127 is moved free of the lock lever 123 allowing the lock lever to engage slidably the back face of the catch member 124. As the index handle is moved past its scan position to a stop position determined by the ledge 83 the end of the catch member 124 is moved past the lock lever, and as the index handle is released from its stop position the spring 125 acting on the pulley 114 returns the index handle slightly to its scan position in which it is detented by abutment of the end of the catch member 124 against the lock lever. As the index handle 20 is raised upwardly from its scan position it is moved against a return force produced by the pressure of the roller 130 against the cam 127. Further in this movement of the index handle 20, the scan bail 25 is moved away from the coupling pin 119 because the pulley 114 is now held latched by the lock lever 123. However, when the index handle is moved into the latch comb 81 just past the flared ends of the teeth 82 the lock lever 123 is cammed rearwardly sufficiently to register with the notch 124a. This registration allows the pulley 114 to be snapped counterclockwise (FIG. 7) a small distance determined by the length of the notch through action of the spring 120 whereby to remove the bias force again from the index handle and define an intermediate detent position thereof. As will appear, the machine is left still in a fully scan or neutral condition when the index handle reaches this intermediate detent position.

As the index handle 20 is moved further upwardly from the intermediate detent position to a point about halfway to play position the lock lever 123 is cammed rearwardly out of the notch 124a allowing then the pulley 114 to be snapped again counterclockwise (FIG. 7) by the spring 120 to recouple the pulley with the index handle by abutment of the drive pin 119 against the scan bail 25, and to cause the spring 120 to exert again a bias force on the index handle to move it to play position. This play position is one wherein the index handle 20 is just short of abutting against the upper end of the slot in the latch comb 81.

The counterclockwise step movements of the pulley 114 during the return of the index handle from scan to play positions results in a windup of the cord 107 coupling the pulley to the carriage shift lever 103. The snap movement of the pulley 114 which occurs when the index handle reaches its intermediate detent position results only in a partial take-up of the coupling spring 108. This take-up of the coupling spring 108 occurs because the spring 104 acting on the carriage shift lever 103 is overpowering. Further, the take-up of the coupling spring 108 varies according to the positioning of the index head 117. When the lock lever is unlatched from the pulley 114 in the movement of the index handle midway between its intermediate detent and play positions, the spring 120 acting on the pulley 114 fully takes up the coupling spring 108 so that in the final movement of the index handle to play position the carriage shift lever 103 is coupled positively to the index handle and is moved to unoperated position out of the pathway of the head carriage. When the shift lever 103 reaches this unoperated position it is latched by a latch lever 131 pivoted also at 112a to the post 112 in common with the lock lever 123. The pulley lock lever 123 has a one-way coupling with the latch lever 131, in counterclockwise directions as the levers appear in FIG. 3, by means of a lug 131a struck up from a short arm of the lever 131 in front of the lock lever to the left of the pivot 112a. A scan switch 133 has a cantilever type pole member 133a bearing against a lug 131c on the latch lever 131 to bias this lever clockwise but with an insufficient force to overcome the spring 125 on the lock lever 123.

In the movement of the index handle 20 from scan to intermediate detent positions the rearward camming of the lock lever 123 releases the latch lever 131 to allow a pin 132 thereon to engage the sector-shaped hub 110 of the carriage shift lever 103 responsive to the force of the pole switch member 133a. When in a continuing movement of the index handle 20 from its intermediate detent position to play position the carriage shift lever reaches its unoperated position the pin 132 rides off the end of the hub 110 to latch the shift lever. The scan switch 133 is in a neutral or scan position while the pin 132 is riding on the hub 110, and is shifted to play position only in response to the latching of the carriage shift lever after the shift lever has reached its unoperated position.

The latch lever 131 has an arm 131b extending obliquely in a rightward forward direction through a guide slot 135 in the lug 74 turned down from the top plate 13 (FIGS. 3 and 11). Secured to the end portion 71c of the lift bail beyond the lug 74 is a block 136 into which is secured a radial pin 137. The arm 131b extends across the block 136 to the left of the pin 137. When the index handle 20 is in scan position the arm 131b bears rearwardly against the pin 137 to hold the lift bail 71 in its raised position shown in FIGS. 3 and 11. A movement of the index handle 20 to its intermediate detent position allows a slight counterclockwise movement of the lift bail from its raised position responsive to a weight biasing of the lift bail and to action of a cantilever spring 138 on the lug 74 bearing against the lift bail, but this movement of the bail is approximately on a tangent line along the lift arm 72 without affecting the elevation of the reproducer head 67. However, as the index handle 20 is moved upwardly from the intermediate detent position to play position, the arm 131b is shifted forwardly the instant the carriage shift lever 103 is latched by the latch lever 131 in unoperated position whereby to allow the lift bail to fall to a horizontal position shown in FIGS. 8 and 13.

To recapitulate the control operations of the index handle 20 above described, it will be noted that upon moving the index handle 20 from play to scan positions the bail 25 bears against the drive pin 119 to move the pulley 114 positively with the index handle. This movement of the pulley 114 produces no control operations however until the lock lever 123 engages the notch 124a to define the intermediate detent position. As the lock lever 123 so engages the notch 124a the latch lever 131 is swung rearwardly with the result that in the sequence herenamed: (1) the arm 131b starts raising the lift bail 71 to disengage the reproducer head from the disk record, (2) the scan switch 133 is shifted from play to scan position, and (3) the pin 132 is moved from the end of the arcuate hub 110 to allow the shift lever 103 to slap against the head carriage to return it to a start position defined by the index plate 100. It is important to note that these events occur only in sequence and that the sequence is triggered only at the instant the index handle reaches its intermediate detent position. Thus, any movement of the index handle from play position short of reaching the intermediate detent position and back again are ineffective in taking the machine out of play condition. During the return of the index handle 20 from its intermediate detent position to play position the lock lever 123 is first disengaged from the end notch 124a to cause the pulley 114 to be snapped ahead by the spring 120 until the drive pin 119 hits the scan bail 25 and then in the continuing movement of the index handle the cord 107 is wound up sufficiently to disengage the shift lever 103 from the head carriage and to move it to its unoperated position. No other events occur until the shift lever reaches its unoperated position. At that instant there occurs in sequence: (1) the shift lever 103 is latched, (2) the scan switch 133 is shifted to play position, and (3) the lift bail 71 is lowered to engage the reproducer head with the disk record. Again, any movements of the index handle from its intermediate detent position short of reaching play position and back again does not shift the machine out of scan condition but at the instant the index handle 20 reaches play position the several events above-noted are triggered to occur in the sequence named. Thus, the machine is rendered foolproof against being placed into any intermediate stage between scan and play conditions.

The shifting of the machine into a repeat or preparatory scan condition, with a lifting of the reproducer head from the record and a returning of the head carriage to a start position determined by the setting of the index head, as the index handle is moved from play to an intermediate detent position still within the latch comb is designed: (1) to permit the pupil to repeat the playing of any selected portion of a record without accidentally shifting the index head and resetting the start position of the head carriage, and (2) to assure that the reproducer head is disengaged from the record prior to scan position to prevent damage either to the stylus or the record when the index handle is moved to scan position for a scanning operation to reset the start position of the head carriage. Also, the detenting of the index handle in scan position is designed to relieve counterrotational forces and thus to prevent accidental striking of the index handle against the ends of the latch teeth during scanning. The provision of the stop ledge 83 just slightly past the scan detent position permits the pupil to slide the index handle along the ledge during scanning if he desires to do so.

Figure 2:
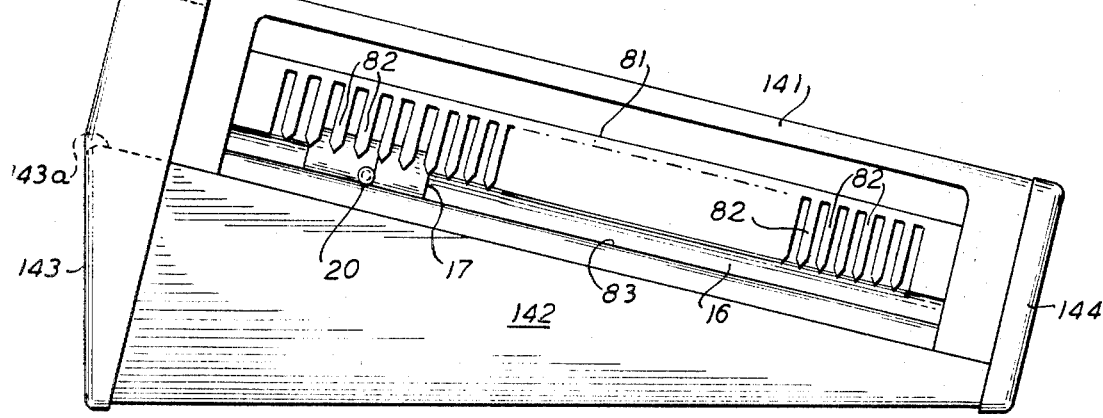
FIG. 2 is a left elevational view of the machine shown in FIG. 1.

The present teaching machine is housed in a cabinet (FIGS. 1 and 2) comprising a top inclined plate 140 parallel with the top plate 13 of the frame, a hood 141 covering the index head structure at the left side of the machine but having a window exposing the latch comb 81 and ledge 83, a side panel 142 completing the lower left side enclosure, a rear molded panel 143 closing the back side but having therein a slot 143a for insertion and removal of disk records into and from the machine, a front die cast panel 144, and a right side panel 145.

The top plate 140 is designed to serve as a support for a book or program sheet 146 having printed thereon the visual material to be taught to the pupil. Since the hood structure 141 is the only element of the cabinet which plays an important part in the mounting of a book or program sheet in a correct position on the top plate 140, it is the only element of the cabinet herein described in detail.

At the left side of the machine is a pin bar 147 (FIGS. 5 and 6). This pin bar has downwardly offset legs 147a and 147b at its front and back ends mounted on the top frame plate 13 to support the pin bar at a clearance distance above the pantograph lever 86. This pin bar has a rabbeted edge 147c along its right side (FIG. 6) forming a support for the top plate 140 in position just flush with the level of the pin bar. Mounted on the front and back portions of the pin bar are locking pins 148 for engaging corresponding holes 149 in the sheet 146 to hold the sheet in place. These locking pins have their top faces 148a inclined upwardly proceeding from right to left and starting at the level of the top plate 140. This inclination permits a sheet 146 to be placed on the plate 140 and to be then slid from right to left to cam the left borders of the sheets over the pins 148 until the holes 149 come into registration with the pins. In order that a sheet may be readily located on the top plate 140 with the holes 149 aligned laterally of the machine with the pins 148, a sheet or book bar 150 is located along the front of the machine providing a ledge against which the sheet or book is located, it being understood that the distance from front to back of the pins from the ledge are equal approximately to the distances of the holes 149 from the front edge of the sheet.

A feature of the hood 141 is to provide it with front and back corner ledges 141a at its right side (FIGS. 5 and 6) which overhang the corresponding corners of a mounted sheet 146. These ledges have arcuate bottom faces 151 above the pins which are adapted to cam the left edge of the sheet 146 downwardly after it has passed the pins as the sheet is slid from right to left along the book bar. The curved bottom faces 151 merge with flat faces 152 spaced from the pin bar by a gap 153 to receive the corners of the mounted sheet flat with the mounting plate 140 when the sheet reaches a fully mounted position. Thus, in the mounting of the sheet 146 the left edge thereof is first raised due to the bevelled faces of the pins 148 and is then cammed downwardly to effect a certain engagement of the holes 149 with the pins. The mounting technique of simply moving the sheet along the book bar is designed to permit the sheets to be mounted correctly by preschool children or persons of any skill, even blind people, without difficulty. A sheet is removed simply by lifting it outwardly in an oblique direction against the under faces of the corner ledges 141a without incurring any danger of the sheet not being disengaged from the pins 148 and being torn.

Between the corner ledges 141a of the hood there is a window 154 as of glass or plastic inset from the pins 148. This window is located at its bottom and top edges in grooves in the pin bar and hood (FIG. 9) and traverses the gap 153 to form a stop for the sheet 146 when the holes 149 come into registration with the pins 148. Directly back of the window 154 is a plate 155 mounted on two upstanding posts 17a on the index head 17. This plate is provided with a vertical pointer line 156 extending from the level of the top plate 140 to a height at least as great as the maximum thickness of a book to be mounted on the machine. Along the left edge of each page or sheet bearing the visual material to be taught to the pupil is a dot 157 at each line where playback of audio material is to be started. Each dot 157 is preferably rectangularly shaped and located to correspond to respective latch position of the index head. The width of each dot 157 is such that when the pointer line is in registration with any portion of the dot, a movement of the index handle from scan to detent position will cause it to engage the flared sides of the latch teeth without obstruction and cam the handle to a centered position. Only the open spaces between dots of successive lines are obstruction points whereat the handle would strike head-on against the pointed end of a latched tooth. Thus, the flaring of the ends of the latched teeth 82 permits a wide latitude in the initial positioning of the index head relative to an indexing dot 157 on the printed page notwithstanding that the head carriage must be very accurately located on the disk record. The use of a thin vertical pointer as described rules out errors due to parallax to permit the pupil to locate the index head easily in registration with any selected dot from any viewing angle.

In teaching the blind the program sheet would have raised characters in Braille, and the window 154 would be left open to permit a tactile arm to be extended from the pointer line 156.

The audio material relating to the respective visual items printed or written on the program sheet 146 are recorded in respective individual bands 28a, 28b, 28c, etc., as indicated in FIG. 3. Each such band is terminated by a control signal of a frequency inaudible to the pupil which will stop the machine, as is later described. The bands are separated by concentric spaces or gaps 158 each traversed by a spiral lead-in groove 159 typically of less than one revolution. A recorded band may correspond to one or more lines of visual material on the program sheet starting from any line. Thus, it is required that the index plate have as many steps 101a as the maximum amount of lines on a sheet or a page of a book.

As an extreme, there may be as many individual recorded bands on one side of a disk record as there are lines on a program sheet. As another extreme, one side of a disk record may comprise a single band and correspond to one or more sheets of pages. If desired, there may be any number of bands of varying length on a side of a disk record, and the marking dots may be located to select certain bands for one sheet, the same or other bands for another sheet, etc., all from one side of a disk record. This latitude of control is permitted because the present machine will play from any latched position of the index head to a variable extent determined by the stop signal and limited only by the end of the record, it being only necessary that each sheet or page be marked by indexing dots 157 at the particular lines of the visual material where the machine is to be started. This affords complete flexibility of both visual and audio programming in that very short audio expressions may be coupled with very long visual items, or very short visual items coupled with very long audio expressions, or anything therebetween. Further, a selection of any band on the record in relation to any visual item may be made irrespective of the location of the visual item on a sheet or page by connecting tail lines to the indexing dots leading to brackets embracing the respective visual items as indicated at 160 in FIG. 1.

The electrical control apparatus of the present machine comprises the normally open load switch 61 operated to closed position by the record centering spindle 60 responsive to depressing the load plate 43 to operated position when a disk record is mounted in the machine, the scan switch 133 operated between play and scan conditions as the index handle 20 is shifted between play and scan positions, a switch 161 of the magnetic reed type mounted on the underside of the section 43a of the load plate (FIGS. 3, 14 and 15) and a magnetic reed switch 165 mounted on the head carriage 66 (FIGS. 3, 12 and 13.) The switches 161 and 165 have extending magnetic armatures 161a and 165a operable by a permanent magnet 162 fixedly mounted directly below the load plate and secured thereto as by a bracket 163 and screws 164 as indicated in FIGS. 3 and 9. Each learning disk record 28 for the present machine is provided with a magnetically soft plate interliner 28p and is recorded to a smaller diameter groove than are conventional disk records. Such learning disk record is described and claimed in the pending Patent Application Ser. No. 689,714, filed Dec. 11, 1967. When such record with an interliner 28p is mounted in the machine the plate shields the magnet 162 from the reed switches 161 and 165 to allow these switches to stand in open position. When these switches are open the machine is able to play to the end of the learning disk record and is stopped by each recorded control signal. However, when a conventional disk record is mounted in the machine the switch 161 is held permanently closed to disable the control-signal stopping circuits and the switch 165 is operated closed when the head carriage is moved slightly past the innermost recorded groove convolution of the conventional record. This operation of the switch 165, herein termed an inner limit switch, marks the end of travel of the head carriage across a conventional disk record, as will appear.

The foregoing control switches are connected in a control circuit as shown in FIG. 16. When a disk record is inserted and the load plate 43 depressed to center the record, the resultant closure of the load switch 61 supplies current from a battery 166 to the pole member of the scan switch 133, a bistable switch 167, and audio amplifier 168 and a tone filter 169. If the index head is latched and the scan switch 133 is in play position an "on" signal is supplied via a lead 170 to the bistable switch to render the transistors 171 and 172 thereof conductive. The transistor 171 turns on the tone filter 169 and also the audio amplifier 168, and the transistor 172 turns on a drive motor 173. The machine therefore starts playing the record. If the disk record is of the learning type with an inner plate, the pickup of a control signal from the disk record will feed through the tone filter and send an "off" signal via a transistor 174 and lead 175 to the bistable switch to turn off the drive motor, the tone filter and the audio amplifier. Thus, the machine is wholly shut off so there is no power drain in the battery 166. If a conventional disk record without a steel plate is inserted in the machine the switch 161 will be held closed to short the transistor 174 at the output end of the tone filter whereby to disable the tone filter. No subsonic frequency signal picked up from the disk record will then any longer operate to shut off the machine. Instead, the machine will play until the stylus reaches the spiral terminating groove at the end of the disk record. At this point the armature 165a of the inner limit switch moves over the permanent magnet 162 and is drawn downwardly to close the switch 165. The closure of this switch feeds an "off" signal to the bistable switch 167 to turn off the machine wholly in the same way as from a prerecorded control signal.

Although the innermost groove on a conventional disk record is typically on a much larger diameter than is the innermost groove of a learning disk record, the magnetic switch 165 is shielded from the permanent magnet 162 by the steel plate of the learning disk record when such record is inserted in the machine, with the result that the switch 165 is then disabled to allow the machine to play further towards the center of the record until a control signal is picked up to shut off the machine as before-described.

As the index handle 20 is shifted to its intermediate detent position, the head carriage is snapped back to start position as before-described and at the same time the scan switch 133 is shifted to feed an "off" signal from the battery 166 via a lead 176 to the input side of the transistor 174 to turn off the machine. If the index handle is thereupon returned to play position the scan switch is returned to start the machine to replay the audio message. This reciprocation of the index handle between play and intermediate positions to repeat an audio message leaves the index head latched against accidental displacement thereof.

In the alternative embodiment shown in FIGS. 17 and 18, the pantograph mechanism above-described is replaced by a threaded stop member which is rotated by the index head through a drum gear and pinion arrangement. In this embodiment a bushing 177 is mounted in the side plate 11. Threaded through this bushing in line laterally of the machine with the upper part of the pin 102 on the head carriage is a tubular screw 178. Extending slidably into this tubular screw is a rod 179 secured at its right end in a frame member 180. Secured to the right end of the screw is a pinion 181 which meshes with a relatively large drum gear 182 having a shaft 183 journaled at its left end in the side frame plate 11 and at its right end in the frame member 180. The shaft 183 has a sprocket wheel 184 secured thereto at the right of the frame member 180. Trained around the wheel 184 and around an idler sprocket wheel 185 at the front of the machine is a sprocket belt 186. Clamped to this sprocket belt 186 is a coupling arm 187 by which the index head 17 is secured to the belt.

By way of example, the head carriage may have a travel range of 2⅛″, and the stop screw 178 may have 24 threads per inch requiring fifty-two turns to traverse the length of travel of the head carriage. The drum gear 182 may be 3″ in diameter and the pinion gear 181 may be ½″ in diameter to require 8⅔ turns of the drum gear to produce fifty-two turns of the stop screw. If the sprocket has approximately ⅜″ diameter the travel of the index head to move the stop screw 178 through the travel range of the head carriage is approximately 10″.

In the alternative embodiment of FIG. 19 the stop screw is replaced by a stop bar 188 of rectangular cross section which is slidably mounted in a sleeve 189 supported by the side frame plate. Below the stop bar to the right of the side frame plate 11 is a drum 190 having a shaft 191 the left end of which is journaled in the side plate 11 and the right end in a frame member 192. The drum 190 has a reduced diameter section to form thereon a spiral set of steps 193 extending through approximately 360° around the drum. A depending arm 188a on the stop bar slidably engages the spiral steps. Secured to the right end of the shaft 191 is a sprocket pulley 194, and trained around this sprocket pulley and around an idler pulley 195 at the front of the machine is a sprocket belt 196. The upper run of this belt is secured to the index head 17 by a coupling link 197. In this case the pitch of the steps around the drum is approximately 2⅛″— the travel range of the head carriage—and the diameter of the pulley 194 is approximately 3¼″ so that a 10″ travel of the index head will produce one revolution of the drum. When the index head is unlatched the spring-urged arm 103 presses the head carriage against a cap 188b on the slide bar and by this pressure the slide bar is moved into camming engagement with the steps 193. As the drum 190 is rotated the head carriage is moved in its path of travel in correspondence with the movement of the index head along the program sheet.

The embodiment of our invention herein described is intended to be illustrative and not necessarily limitative of our invention since the same is subject to changes and modifications without departure from the scope of our invention, which we endeavor to express according to the following claims.

We claim:

1. In a phonographic audio-visual teaching machine having a support for a record bearing a prerecorded spiral groove, drive means for rotating the record, a reproducer head, and a shiftable carriage for said reproducer head freely movable in an advance direction by tracking engagement of the reproducer head with said spiral groove as the record is rotated: the combination of means for locating a program sheet on said machine, said sheet having different visual items thereon to be selected by the pupil and said record having different audio messages recorded thereon corresponding to different visual items, an index head movable to index positions along a side edge of a mounted program sheet, means operable by said index head for shifting the reproducer head carriage to start positions at different audio messages corresponding to different visual items designated on the program sheet as said index head is moved to respective index positions, an index handle on said index head shiftable relative to the head between scan and play positions, and means operable by said handle as the same is moved from scan to play position for latching said index head, and thereupon starting the machine to play the audio message running from said start position.

2. The phonographic machine set forth in claim 1 wherein said index handle has a range of movement running from play position in which said index head remains latched, including means to detent said index handle in an intermediate position at the outer end of said latching range, means operative in sequence when said index handle in a movement thereof from play position reaches said intermediate detent position for lifting the reproducer head from the record, stopping the machine and resetting the reproducer head to the start position corresponding to the setting of said index head, and means operative in sequence when said index handle in a movement thereof from said intermediate detent position reaches said play position for freeing the reproducer head for advance movement from said start position, starting said machine and lowering the reproducer head on the record.

3. The phonographic machine set forth in claim 2 including means for also detenting said index handle in play and scan positions respectively, and stop means operative throughout the range of said index head for limiting movement of the index handle past its scan and play positions.

4. The phonographic machine set forth in claim 2 wherein said latching means comprises a latch comb extending along the path of said index head, said latch comb having a series of teeth with intervening slots respectively engageable by said handle as the handle is turned from scan position, said latch teeth having flared end portions for receiving said handle within a latitude of positioning of said index head relative to its respective indexing positions and for camming the index head at its respective indexing positions as said handle is moved from scan position to said intermediate detent position.

5. The phonographic machine set forth in claim 4 including means for detenting said index handle in scan and play positions respectively, the inner ends of said slots providing a definite stop for movement of said handle past play position, and a stop ledge along the path of said index head providing a stop for said index handle past scan position.

6. In a phonographic audio-visual teaching machine having a support for a record bearing a prerecorded spiral groove, drive means for rotating the record, a reproducer head, and a shiftable carriage for said reproducer head freely movable in an advance direction by tracking engagement of the reproducer head with said spiral groove as the record is rotated: the combination of means for locating a program sheet on said machine, said sheet having different visual items thereon to be selected by the pupil and said record having different audio messages recorded thereon corresponding to different visual items, an index head movable to index positions along a side edge of mounted program sheets, means operable by said index head for shifting the reproducer head carriage to start positions at different audio messages corresponding to different visual items designated on the program sheet as said index head is moved to respective index positions, means rendered operable by movement of said index head to an index position for starting the machine, said machine being adapted for playing both conventional disk records and learning disk records characterized as having therein magnetically soft steel interliners, said learning disk records having prerecorded bands related to respective visual items on said sheet and to be selected by said index head, each of said bands terminating with a prerecorded control signal, and means responsive to pickup of said control signal only from records having said steel interliners for stopping the machine.

7. The phonographic machine set forth in claim 6 including means responsive only to conventional disk records without said steel interliner for stopping the machine when the reproducer head reaches a predetermined position across the record.

8. A phonographic machine adapted for playing both conventional disk records and learning disk records characterized as including magnetically soft steel plate interliners, said machine comprising a support for a disk record, means for rotating the disk record, a reproducer head mounted for movement across said record as the record is rotated, and switch means operable by said reproducer head for stopping said machine when the head reaches a predetermined position marking the end of a conventional disk record, said means comprising a magnetic switch moved across one side of the record in accordance with the movement of the reproducer head and a permanent magnet at the other side of the record for operating the switch when the switch reaches a predetermined position, said switch being shielded from said magnet by the steel plate interliner of a learning disk record whereby to disable the switch means when a learning disk record is mounted in the machine.

9. A phonographic machine adapted for playing both conventional disk records and learning disk records characterized as including magnetically soft steel plate interliners, said machine comprising a support for a disk record, means for rotating the disk record, a reproducer head mounted for movement across said record as the record is rotated, means for stopping the machine responsive to a control signal of predetermined frequency picked up from the record, and means including a magnetic switch mounted at one side of a mounted record and a permanent magnet at the other side of the record for enabling said stopping means when a learning disk record is mounted in the machine and for disabling said stopping means when a conventional disk record is mounted in the machine.

10. In a phonographic audio-visual machine having a support for a record bearing a prerecorded spiral groove, drive means for rotating the record, a reproducer head, and a shiftable carriage for said reproducer head freely movable in an advance direction by tracking engagement of the reproducer head with said spiral groove: the combination of means for locating a program sheet on said machine, said sheet having different visual items thereon to be selected by the pupil and said record having different audio messages recorded thereon corresponding to different visual items, an index head movable to index positions along a side edge of mounted program sheets, and means operable by said index head for shifting the reproducer head carriage to start positions at different audio messages on the record corresponding to different visual items designated on the program sheet as said index head is moved to respective index positions, said shifting means including an index member operable by the index head against the head carriage, a movable carriage return arm, and a spring biasing said arm against said head carriage for yieldably holding the head carriage in engagement with said index member.

11. The phonographic machine set forth in claim 10 including a control handle movable between scan and play positions, and means operable by said control handle for moving said arm to unoperated position out of the path of travel of the head carriage to free the reproducer head for tracking engagement with the record as said control handle is moved to play position and for releasing said arm against the head carriage to return the head carriage against said index member as said control handle is moved from play position whereby during scanning the carriage return arm maintains the head carriage in camming engagement with the index member.

12. The phonographic machine set forth in claim 11 including means operable to latch said carriage return arm in said unoperated position, means for latching said index head when said control handle is between play position and a predetermined intermediate position, and means controlled by said handle for latching said carriage return arm by movement of said handle from intermediate position only when the handle reaches said play position and for unlatching said carriage return arm by movement of said control handle from play position only when the handle reaches said intermediate position.

13. The phonographic machine set forth in claim 12 wherein said latching means for said carriage return arm comprises a latch lever and a catch on said return arm engageable by said latch lever when the return arm reaches said unoperated position, including a lift member for said reproducer head controlled by said latch lever to lower said reproducer head onto the record as said carriage return arm is latched and to raise first said reproducer head from the record as said carriage return arm is unlatched.

14. The phonographic machine set forth in claim 12 including a support member on which said index head is slidably and rotatably mounted, means mounting said control handle on said index head for turning the latter, a pulley coupled to said handle only in the direction of movement of the handle from play to scan positions, a spring biasing said pulley in its other direction, a cord connected to said pulley and wound at least partially therearound by movement of the pulley in said other direction, a take-up spring connecting said cord to said carriage return arm, means placing a tension limit on said take-up spring, said pulley biasing spring being adapted to overpower said take-up spring and said arm biasing spring to move said arm to unoperated position as said handle is moved from scan to play positions, said take-up spring operating to maintain the cord taut on said pulley during movement of said handle from play to scan positions prior to the unlatching of said carriage return arm.

15. The phonographic machine set forth in claim 14 including means for latching said pulley against movement in said other direction when said handle is in scan and intermediate positions.

16. The phonographic machine set forth in claim 10 including means for moving said index member crosswise of the direction of travel of the head carriage as said index head is moved along the program sheet, said index member having a stepped edge the successive steps of which are moved into the path of the head carriage as said index head is moved into successive index positions, said steps being connected by inclined risers enabling the head carriage to be cammed along said stepped edge as said index head is moved along the program sheet.

17. The phonographic machine set forth in claim 16 wherein said index head is mounted for rotational movement including a handle connected to said index head for rotating the same, a latch comb extending along the path of indexing movement of said index head having a series of equally spaced teeth with intervening slots engageable by said handle to latch said index head in respective equally spaced index positions.

18. The phonographic machine set forth in claim 16 wherein said head carriage has an extending pin engageable with the respective steps of said index member responsive to the biasing force of said carriage return arm, said pin having a diameter equal approximately to twice the length of said respective steps.

19. The phonographic machine set forth in claim 10 including a pantograph mechanism between said index head and said carriage index member for moving the latter in direct proportion to the movement of the index head.

20. The phonographic machine set forth in claim 10 wherein said index member is slidably mounted for movement along the path of the head carriage comprising a rotatable drum having a series of steps in the periphery thereof in a spiral arrangement around the drum, said steps being joined by oblique riser edges, a cam follower on said index member for engaging said spirally arranged steps under pressure from said carriage return arm, and means for rotating said drum by the movement of said index head.

21. The phonographic machine set forth in claim 10 wherein said acrriage index member comprises a screw member having an end surface in the path of said carriage, said screw member being threaded in fixed relation to the frame of the machine for movement along said path as the screw member is rotated, a pinion secured to said screw member, a drum gear journaled in parallel relation to said screw member and engaged by said pinion to cause the screw member to be turned with resultant travel of the screw member and pinion along the drum as the drum gear is rotated, and means for rotating said drum gear by movement of the index head.

22. A phonographic machine adapted for reproducing sound intelligence coordinated with selected visual items on a printed program sheet mounted on the machine, comprising a rotatable record having spaced bands of recorded grooves bearing a recorded intelligence corresponding to said printed items, a head carriage including a reproducer head mounted for movement across the record, an index head movable relative to said sheet, a shiftable handle on said index head, a latch comb cooperable with said index handle for latching the index head in any of a series of equally spaced indexing positions, said index handle having a range of movement within said comb at each latching of said index head, means for locating the head carriage in advance of a recorded band as said index head is moved to a corresponding item on said sheet, and means for starting rotation of said record as said index handle is moved to a play position at the inner end of said comb and for stopping rotation of said record as said index handle is returned to an intermediate position near the outer end of said comb.

23. In a random access audio-visual phonographic machine having a support for a record bearing a prerecorded spiral groove, means for rotating the record, a reproducer head, and a shiftable carriage for said reproducer head freely mounted for movement in an advance direction by tracking engagement of the reproducer head with said spiral groove as the record is rotated: the combination of means for locating a program sheet on said machine, said sheet having different visual items thereon to be selected by the pupil and said record having different audio messages recorded thereon corresponding to different visual items, an index head movable along a side edge of a mounted sheet, an index plate having a stepped edge movable by said index head to define a series of start positions of the head at different audio messages corresponding to different visual items designated on the program sheet, an index handle on said index head shiftable between scan and play positions, a latch comb engageable by said index handle as the same is moved from scan position, means for detenting said index handle in an intermediate position when the handle engages said latch comb, a spring biased shift arm for holding the head carriage in camming engagement with said stepped edge, an electrical audio system including a switch shiftable between play and off positions, means operable in sequence only when in a movement of said index handle from said intermediate detent position the handle reaches play position for removing said shift arm from the path of said head carriage and latching the same, and thereupon shifting said switch into play position and lowering said reproducer head onto the record, and means operable in sequence when in a movement of the index handle from play position the same reaches said intermediate detent position for lifting said reproducer head from the record, and thereupon shifting said switch into off position and releasing said shift arm against the head carriage.

24. In a random access phonograph for playing selected portions of a prerecorded record relative to visual items on a program sheet: the combination of a supporting plate on said machine for said program sheet, said sheet having punched locating holes in a side border portion thereof, pins upstanding from a side border portion of said plate for engaging said holes to locate said sheet in a mounted position, said pins having beveled top faces inclined upwardly from the level of said plate permitting said sheet to be cammed over said pins by a sidewise movement of the sheet, and covers over said pins at a clearance spacing therefrom having downwardly curved under surfaces for engaging the edge of the sheet past said pins and deflecting the sheet downwardly to cause the pins to engage said holes when the holes come into registration with the pins.

25. The phonograph set forth in claim 24 including a locating bar on said plate along which a program sheet can be slid for guiding the sheet into position wherein said pins will register with said holes.

26. The phonograph set forth in claim 24 including an index head movable along said side border portion of a mounted program sheet for selecting portions of said record to be played, indexing dots on said side border portion of said sheet indicating positions at which said index head is to be set, and pointer means on said index head comprising a near vertical plate at the edge of a mounted sheet having a near vertical pointer line thereon to enable the index head to be set within the width dimensions of said respective dots from any viewing angle of said pointer line.

27. The phonograph set forth in claim 26 including a latch comb extending along the path of said index head, an index handle on said index head shiftable sidewise of said path, said latch comb having a series of spaced teeth with intervening slots corresponding to respective dots on said sheet and engageable by said handle in the sidewise shifting thereof to latch said index head, said teeth having flared end portions terminating in pointed ends permitting engagement of said handle with said respective slots within a latitude of positioning of the index head wherein said pointer line is within the width of a respective dot, said flared end portions operating to cam said index head to bring said pointer line at the center of a respective dot as said handle is engaged with said comb.

28. In a random access phonograph for playing selected portions of a prerecorded record relative to visual items on the respective pages of a book: the combination of a supporting plate on said phonograph for receiving said book thereon in an open condition, locating pins at one side of said plate, said book having a cover with locating holes in a side border thereof for receiving said pins and defining a correct mounted position for the book, said pages of said book being notched to clear said pins, an index head shiftable to respective index positions along said side border of said cover of the book, and a reproducer head shiftable by said index head to different start positions on the record corresponding to said different index positions of said index head.

29. In a phonographic audio-visual teaching machine having means for rotating a disk record, and a reproducer head movably mounted for tracking engagement with the record: the combination of guide means having a slot for slidably receiving respective disk records of uniform thickness and guiding the same into a mounted position in the machine, means for locating a program sheet on said machine, said sheet having different visual items thereon to be selected by the pupil and said record having different audio messages recorded thereon corresponding to different visual items, an index head movable to different index positions along a side edge of a mounted program sheet, means operable by said index head for shifting the reproducer head to start positions at different audio messages on said disk record corresponding to different visual items on said program sheet, and means for preventing inadvertent mounting of a second disk record in said machine overlapping an already mounted disk record comprising a support roller for a mounted record and a blocking member at a distance from said support roller providing only a clearance space for a single disk record therebetween.

30. In a audio-visual phonographic teaching machine adapted to be battery operated and to be stopped by a control signal of predetermined frequency recorded on the record: the combination of a drive motor for rotating said record, a reproducer head, an audio amplifier, an electronic tone filter effective when energized to pass control signals of said frequency from said reproducer head, a bistable switch connected to the output of said tone filter to cause the same to be operated when energized by said control signal, a battery, and means controlled by said bistable switch as the switch is operated for opening the circuit of said drive motor and for shutting off current supply from said battery to said amplifier and tone filter and bistable switch.

References Cited

UNITED STATES PATENTS

| | | | |
|---|---|---|---|
| 1,930,286 | 10/1933 | Runyan | 35—8 |
| 2,082,261 | 6/1937 | Runyan | 40—28.1 X |
| 3,086,297 | 4/1963 | Kantrowitz. | |

EUGENE R. CAPOZIO, Primary Examiner

W. H. GRIEB, Assistant Examiner

U.S. Cl. X.R.

35—35; 274—14